United States Patent
Wiseman

(10) Patent No.: US 9,218,490 B2
(45) Date of Patent: Dec. 22, 2015

(54) USING A TRUSTED PLATFORM MODULE FOR BOOT POLICY AND SECURE FIRMWARE

(75) Inventor: Willard M. Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 13/976,478

(22) PCT Filed: Dec. 30, 2011

(86) PCT No.: PCT/US2011/068078
§ 371 (c)(1),
(2), (4) Date: Jun. 27, 2013

(87) PCT Pub. No.: WO2013/101178
PCT Pub. Date: Jul. 4, 2013

(65) Prior Publication Data
US 2014/0047229 A1    Feb. 13, 2014

(51) Int. Cl.
| G06F 9/00 | (2006.01) |
| G06F 3/00 | (2006.01) |
| G06F 21/57 | (2013.01) |
| G06F 13/14 | (2006.01) |
| G06F 12/02 | (2006.01) |
| G06F 9/44 | (2006.01) |

(52) U.S. Cl.
CPC ............ *G06F 21/572* (2013.01); *G06F 9/4401* (2013.01); *G06F 12/0246* (2013.01); *G06F 13/14* (2013.01)

(58) Field of Classification Search
None
See application file for complete search history.

(56) References Cited

U.S. PATENT DOCUMENTS

| 6,678,833 | B1 * | 1/2004 | Grawrock ...................... 713/401 |
| 7,702,907 | B2 | 4/2010 | Vaha-Sipila et al. |
| 7,996,687 | B2 * | 8/2011 | Arndt et al. ................... 713/189 |
| 2002/0087877 | A1 * | 7/2002 | Grawrock ...................... 713/200 |
| 2005/0149729 | A1 | 7/2005 | Zimmer et al. |
| 2008/0155277 | A1 * | 6/2008 | Bulusu et al. ................. 713/193 |
| 2009/0158419 | A1 | 6/2009 | Boyce |
| 2010/0281273 | A1 | 11/2010 | Lee et al. |
| 2011/0191580 | A1 | 8/2011 | Iftode et al. |

FOREIGN PATENT DOCUMENTS

WO    2013/101178 A1    7/2013

OTHER PUBLICATIONS

International Search Report and Written Opinion received for International Application No. PCT/US2011/068078, mailed on Jun. 28, 2012, 9 pages.
International Preliminary Report on Patentability received for PCT Patent Application No. PCT/US2011/068078, mailed on Jul. 10, 201, 6 pages.

* cited by examiner

*Primary Examiner* — Idriss N Alrobaye
*Assistant Examiner* — Richard B Franklin
(74) *Attorney, Agent, or Firm* — Thomas R. Lane

(57) ABSTRACT

Embodiments of apparatuses and methods for using a trusted platform module for boot policy and secure firmware are disclosed. In one embodiment, a trusted platform module includes a non-volatile memory, a port, and a mapping structure. The port is to receive an input/output transaction from a serial bus. The transaction includes a system memory address in the address space of a processor. The mapping structure is to map the system memory address to a first location in non-volatile memory.

18 Claims, 2 Drawing Sheets

USING A TRUSTED PLATFORM MODULE FOR BOOT POLICY AND SECURE FIRMWARE

BACKGROUND

1. Field

The present disclosure pertains to the field of information processing, and more particularly, to the field of security in information processing systems.

2. Description of Related Art

A Trusted Platform Module ("TPM") is a hardware component that provides a specific set of security functions to an information processing system. These functions include secure key generation and storage and authenticated access to encrypted data. A TPM may be implemented according to specifications such as the TPM Main Specification Version 1.2, published by the Trusted Computed Group and available from the Internet at www.trustedcomputinggroup.org.

The sub-components of a TPM may include an execution engine and secure non-volatile ("NV") memory or storage. The secure NV memory may be used to store sensitive information, such as encryption keys, and the execution engine may be used to protect the sensitive information according to the security policies dictated by the TPM's control logic. An inherent feature of a TPM is the control logic that implements access controls which prevent unauthorized access to the NV memory. A TPM is typically accessed through a serial bus connection.

BRIEF DESCRIPTION OF THE FIGURES

The present invention is illustrated. by way of example and. not limitation in the accompanying figures.

DETAILED DESCRIPTION

Embodiments of apparatuses, methods, and systems for using a TPM for boot policy and secure firmware are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention may be used for managing boot policy and for storing basic input/output system ("BIOS") firmware and firmware for platform components such as embedded controllers, taking advantage of a TPM's strict access control features. Embodiments provide for a using the NV memory of a TPM to store such firmware, and adding a mapping table to the TPM to provide for this NV memory space to be accessed as memory mapped input/out (MMIO) memory space, so that a processor or other agent can access the firmware using instructions and/or micro-instructions based on its standard instruction set architecture and microarchitecture, rather than requiring it to use the special access commands typically needed to access NV memory of a TPM.

Figure 1:
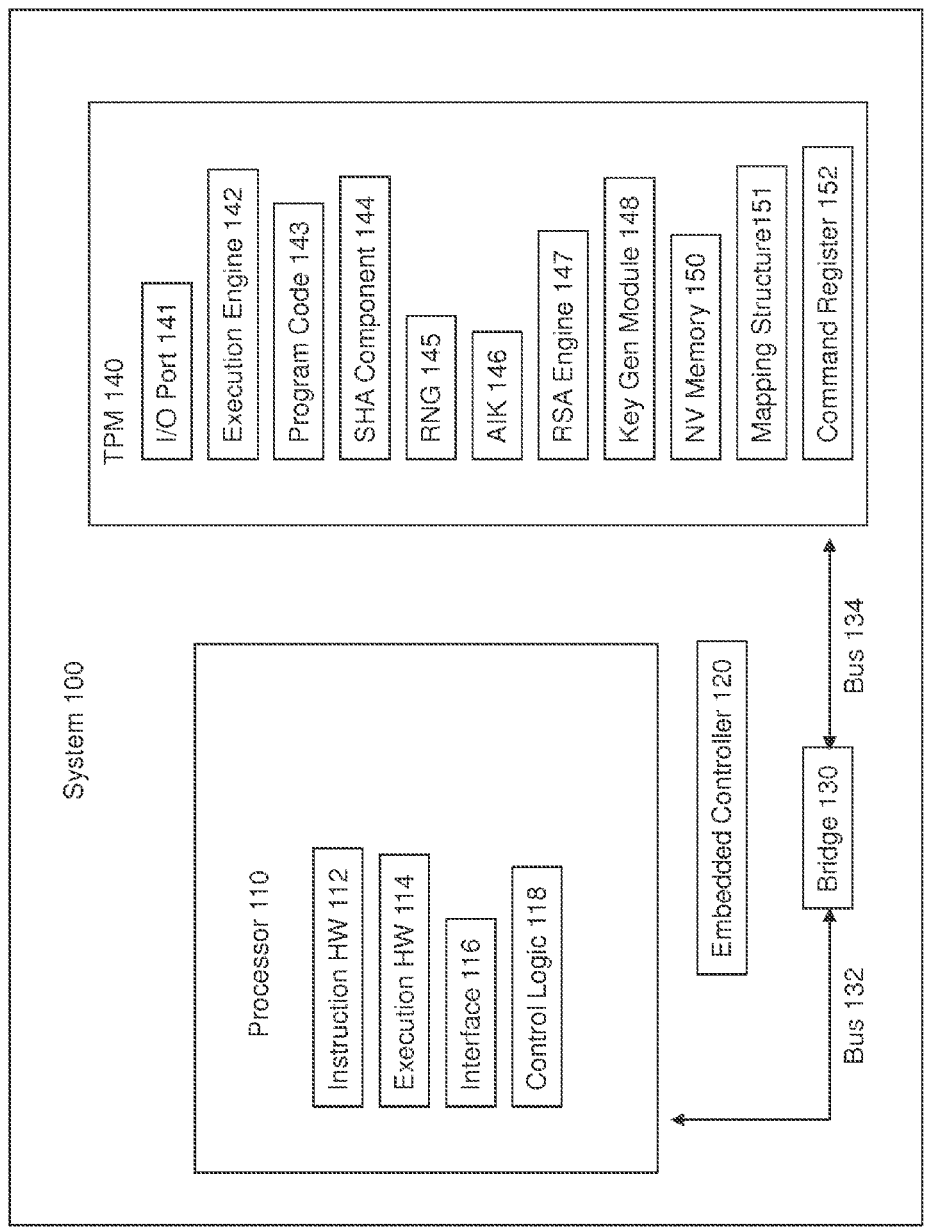
FIG. 1 illustrates a system and a TPM in which an embodiment of the present invention may be present and/or operate.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor 110, embedded controller 120, bridge 130, and TPM 140. Systems embodying the present invention may include number of each of these components and any other components or other elements. Any or all of the components or other elements in any system embodiment may be connected, coupled, or otherwise in communication with each other through any number of buses, point-to-point, or other wired or wireless connections.

Processor 110 may represent any type of processor, including a general purpose microprocessor, such as a processor in the Core® Processor family, or other processor family from Intel Corporation, or another processor from another company, or any other processor for processing information according to an embodiment of the present invention. Processor 110 may include any number of execution cores and/or support any number of execution threads, and therefore may represent any number of physical or logical processors, and/ or may represent a multi-processor component or unit.

Processor 110 may include instruction hardware 112, execution hardware 114, interface 116, and control logic 118, plus any other desired units or elements.

Instruction hardware 112 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution hardware 114. Execution hardware 114 may include any circuitry, structure, or other hardware, such as an arithmetic unit, logic unit, floating point unit, shifter, etc., for processing data and executing instructions, micro-instructions, and/or micro-operations.

Interface unit 116 may represent any circuitry, structure, or other hardware, such as a bus unit or any other unit, port, or interface, to allow processor 110 to communicate with other components in system 100 through any type of bus, point to point, or other connection, directly or through any other component, such as a memory controller or a bus bridge.

Control logic 118 may represent microcode, programmable logic, hard-coded logic, or any other type of logic to control the operation of the units and other elements of processor 110 and the transfer of data within processor 110. Control logic 1.18 may cause processor 110 to perform or participate in the performance of method embodiments of the present invention, such as the method embodiments described below, for example, by causing processor 110 to execute instructions received by instruction hardware 112 and micro-instructions or micro-operations derived from instructions received by instruction hardware 112.

Embedded controller 120 may represent any embedded controller, microcontroller, or other component or device, the operation of which may include the use of firmware. Bridge 130 may represent any component or device including circuitry or logic to provide for the communication between components, devices, or other elements of system 100. For example, bridge 130 may include a bridge between a bus through which processor 110 may access memory and a bus through which 110 devices may be accessed. Therefore, bridge 130 may provide for forwarding MMIO transactions from processor 110 through processor bus 132 to TPM 140 through serial bus 134.

TPM 140 includes I/O port 141 for receiving TPM commands and communicating the results over a serial bus, such as a serial peripheral interface ("SPI") or low pin count ("LPC") bus. Execution engine 142 executes program code 143 in response to the TPM commands and utilizes a variety of different TPM components to perform the necessary operations including a secure hash algorithm 1 (SHA-1) component 144 for performing SHA-1 hash operations; a random number generator 145 for generating random numbers; an attestation identify key (AIK) component 146 for securely establishing that a remote entity is communicating with the TPM; an RSA engine 147 for implementing RSA encryption and digital signatures; and a key generation module 148 for generating keys.

TPM 140 also includes NV memory 150, mapping structure 151, and command register 152, Mapping structure 151 may be include any circuitry, structure, or other hardware or firmware to map storage locations in NV memory 150 to addresses within the system memory space of system 100. Therefore, NV memory 150 may be accessed with memory transactions from processor 110 or embedded controller 120, forwarded to serial bus 134 through bridge 130 as MMIO transactions. The addresses may be received from serial bus 134 at I/O port 141, and mapped to a location in NV memory 150 by mapping structure 151, Therefore. NV memory 150 may be used to store firmware that may be accessed and executed by processor 110 or embedded controller 120 as if the firmware was stored in a flash memory or other NV memory elsewhere in system 100. However, the access control mechanisms of TPM 140 provide a higher level of security than that of a flash memory or other NV memory elsewhere in system 100.

Therefore, NV memory 150 may be used to securely store boot policy and BIOS firmware that may be executed by processor 100 in response to memory transactions initiated by control logic 118. Similarly, NV memory 150 may be used to securely store firmware to be executed by embedded controller 120 or other system components.

Command register 152 may he used to further control the mapping of the address received at 110 port 141 to a location in NV memory 150. For example, command register 152 may include bits or fields to be used to enable mapping by mapping structure 151 and/or to direct an access to recovery BIOS instead of standard BIOS.

Figure 2:
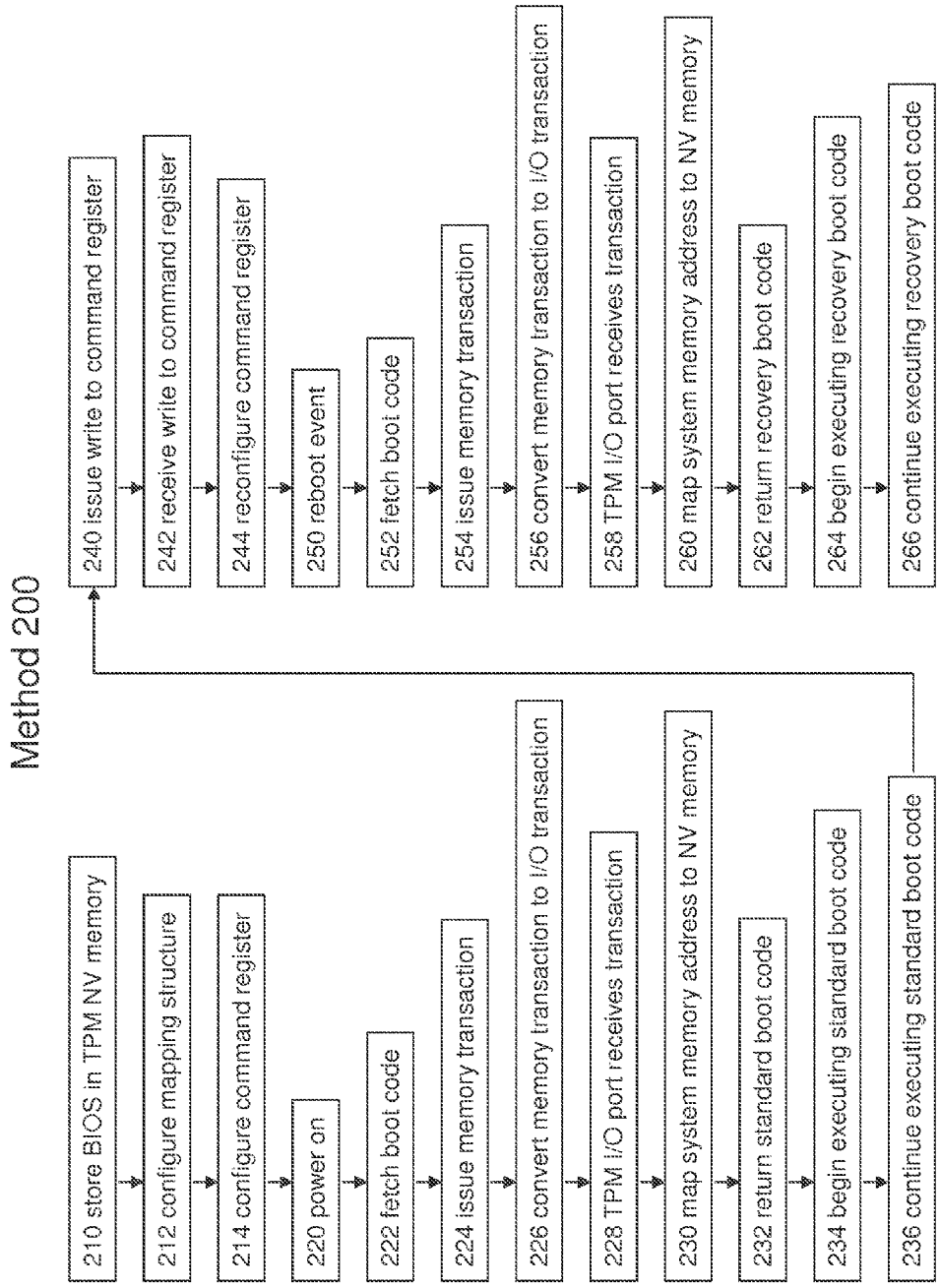
FIG. 2 illustrates a method for using, a TPM for boot policy and secure firmware according to an embodiment of the present invention.

FIG. 2 illustrate method 200 for using a TPM for boot policy and secure firmware according to an embodiment of the present invention. The description of FIG. 2 may refer to elements of FIG. 1, but method 200 and other method embodiments of the present invention are not intended to be limited by these references.

In box 210, TPM 140 is configured with standard BIOS and recovery BIOS stored in NV memory 150. In box 212, mapping structure 151 is configured to map the system memory addresses for BIOS to the corresponding locations in NV memory 150 where standard BIOS and recovery BIOS have been stored. In box 214, command register 152 is configured to direct BIOS accesses to standard BIOS instead of recovery BIOS.

In box 220, system 100 is powered on. In box 222, control logic 11$ directs instruction hardware 112 to fetch the first line of boot code. In box 224, interface 116 unit issues a memory transaction on processor bus 132 to fetch the first line of boot code. In box 226, bridge 130 converts the transaction to a MMIO transaction on serial bus 134. In box 228, I/O port 141 receives the transaction.

In box 230, mapping structure 151 maps the I/O address to a location in NV memory 150 at which the first line of boot code in standard BIOS has been stored, in box 232, the first line of boot code is returned to instruction hardware 111 through I/O port 141, serial bus 134, bridge 130, processor bus 132, and interface 116 unit. In box 234, execution hardware 112 executes the first line of standard boot code. In box 236, processor 100 continues executing standard boot code from TPM 140.

In box 240, processor 110 issues a write transaction to command register 152 to enable booting from recovery BIOS instead of standard BIOS, In box 242, the transaction is received by I/O port 141, In box 244, command register 152 is programmed to direct an access to the first line of boot code to the NV memory location in which recovery BIOS has been stored.

In box 250. system 100 experiences an event which requires a reboot. In box 252, control logic 118 directs instruction hardware 112 to fetch the first line of boot code. In box 254, interface unit 116 issues a memory transaction on processor bus 132 to fetch the first line of boot code, In box 256, bridge 130 converts the transaction to a MMIO transaction on serial bus 134, In box 258, 110 port 141 receives the transaction.

In box 260, mapping structure 151 maps the I/O address to a location in NV memory 150 at which the first line of boot code in recovery BIOS has been stored. In box 262, the first line of recovery boot code is returned to instruction hardware 111 through I/O port 141, serial bus 134.

bridge 130, processor bus 132, and interface unit 116. In box 264, execution hardware 112 executes the first line of recovery boot code. In box 266, processor 100 continues executing recovery boot code from TPM 140, Within the scope of the present invention, the method illustrated in FIG. 2 may be is performed in a different order, with illustrated boxes omitted, with additional boxes added, or with a combination of reordered, omitted, or additional boxes.

Thus, apparatuses. methods, and systems for using a TPM for boot policy and secure firmware have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A trusted platform module comprising:
   non-volatile memory in which to store basic input/output system code at a first location;
   a port to receive an input/output transaction from a serial bus, the transaction including a system memory address in the address space of a processor; and
   a mapping structure to map the system memory address to the first location in non-volatile memory.

2. The trusted platform module of claim 1, further comprising a command register to direct the input/output transaction to a second location in non-volatile memory instead of the first location.

3. The trusted platform module of claim 2, wherein the non-volatile memory is to store standard basic input/output system code in the first location.

4. The trusted platform module of claim 3, wherein the non-volatile memory is to store recovery basic input/output system code in the second location.

5. A method comprising:
   storing basic input/output system code at a first location in non-volatile memory of a trusted platform module;
   receiving, by the trusted platform module, a first input/output transaction from a serial bus, the first input/output transaction including a first system memory address in the address space of a processor; and
   mapping, by the trusted platform module, the first system memory address to the first location.

6. The method of claim 5, further comprising configuring a command register in the trusted platform module to direct the first input/output transaction to a second location in the non-volatile memory instead of the first location.

7. The method of claim 6, wherein storing basic input/output system code at a first location in non-volatile memory of a trusted platform module further comprises storing standard basic input/output system code at the first location.

8. The method of claim 7, further comprising storing recovery basic input/output system code at the second location.

9. The method of claim 6, further comprising issuing, by the processor, a write transaction to configure the command register.

10. The method of claim 5, further comprising configuring a mapping structure in the trusted platform module to map the first system memory address to the first location in the non-volatile memory.

11. The method of claim 10, further comprising:
    issuing, by the processor, a memory transaction to boot a system; and
    converting, by a bridge, the memory transaction to the first input/output transaction.

12. The method of claim 5, further comprising storing embedded controller firmware at a third location in the non-volatile memory.

13. The method of claim 12, further comprising:
    issuing, by an embedded controller, a memory transaction including a second system memory address in the address space of the processor;
    converting, by a bridge, the memory transaction to a second input/output transaction; and
    mapping, by the trusted platform module, the second system memory address to the third location.

14. A system comprising:
    a processor including
      instruction hardware to fetch a first instruction from a first system memory address in the address space of the processor, and
      an interface unit to issue a first memory transaction including the first system memory address; and
    a trusted platform module including:
      non-volatile memory in which to store basic input/output system code at a first location,
      a port to receive a first input/output transaction from a serial bus, the transaction including the first system memory address, and
      a mapping structure to map the first system memory address to a first location in non-volatile memory.

15. The system of claim 14, further comprising a bridge to convert the first memory transaction to the first input/output transaction.

16. The system of claim 14, wherein the first instruction is to boot the system.

17. The system of claim 14, further comprising an embedded controller to issue a second memory transaction including a second system memory address in the address space of the processor, wherein the mapping structure is also to map the second system memory address to a second location in non-volatile memory.

18. The system of claim 17, wherein the second location is to store embedded controller firmware.

* * * * *